(12) United States Patent
Aggarwal et al.

(10) Patent No.: US 12,423,321 B2
(45) Date of Patent: Sep. 23, 2025

(54) AUTONOMOUS USER-DIRECTED INSIGHTS AND DASHBOARD RECOMMENDATIONS

(71) Applicant: Oracle International Corporation, Redwood City, CA (US)

(72) Inventors: Vijay Kumar Aggarwal, Schwenksville, PA (US); Manjunath Rajanna Gangadhar, Danville, CA (US); Vivek Gandhari, Borabanda (IN); Renu Chintalapati, San Ramon, CA (US); Ashlesh Bajpai, Fremont, CA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 18/494,029

(22) Filed: Oct. 25, 2023

(65) Prior Publication Data

US 2025/0139118 A1    May 1, 2025

(51) Int. Cl.
*G06F 16/26* (2019.01)
*G06F 16/2457* (2019.01)

(52) U.S. Cl.
CPC ........ *G06F 16/26* (2019.01); *G06F 16/24578* (2019.01)

(58) Field of Classification Search
CPC ... G06F 16/26; G06F 16/24578; G06F 16/907
See application file for complete search history.

(56) References Cited

U.S. PATENT DOCUMENTS

| | | | |
|---|---|---|---|
| 10,320,633 B1* | 6/2019 | Wong | H04L 67/535 |
| 2013/0103628 A1* | 4/2013 | Skelton | G06Q 30/02 |
| | | | 706/46 |
| 2020/0104775 A1* | 4/2020 | Chintalapati | G06Q 10/06393 |
| 2020/0210647 A1 | 7/2020 | Panuganty et al. | |

(Continued)

OTHER PUBLICATIONS

International Search Report & Written Opinion for PCT/US2024/051754 mailed Feb. 18, 2025, Authorized Officer: Frank, Korbinian, 11 pages.

*Primary Examiner* — Kris E Mackes

(57) ABSTRACT

Systems and methods for providing autonomous user-directed insights and recommendations are provided herein. For example, a system includes a non-transitory computer-readable medium and a processor communicatively coupled to the non-transitory computer-readable medium. The processor is configured to execute processor-executable instructions to determine, by an insight engine, first usage tracking information associated with a first client device and generate, by the insight engine, a user-directed insight based on the first usage tracking information associated with the first client device. The user-directed insight includes a natural language insight. The processor is also configured to execute processor-executable instructions to generate, by a recommendation engine, recommendations based on the user-directed insight and the first usage tracking information, where each of the recommendations includes a recommendation response and one of a recommendation for a dashboard profile corresponding to the user-directed insight or a recommendation for creating a dashboard corresponding to the user-directed insight.

20 Claims, 9 Drawing Sheets

(56) References Cited

U.S. PATENT DOCUMENTS

| | | | |
|---|---|---|---|
| 2020/0327134 A1* | 10/2020 | Freed | G06F 16/288 |
| 2021/0240702 A1* | 8/2021 | Mei | G06F 16/2425 |
| 2021/0295188 A1* | 9/2021 | Dunwoody | G06N 5/045 |
| 2022/0083570 A1* | 3/2022 | Durg | G06Q 30/0206 |
| 2022/0198264 A1 | 6/2022 | Guo et al. | |
| 2022/0237228 A1* | 7/2022 | Xu | G06F 16/2474 |
| 2023/0367784 A1* | 11/2023 | Jacobs | G16H 50/70 |

* cited by examiner

Dashboard Components

*There is no dashboard to analyze related to your insight. A useful dashboard, however, could contain the following components:*

1. Cost of turnover: This metric measures the cost of employee turnover, which can include the cost of hiring new employees, training new employees, and lost productivity.

2. Time to fill open positions: This metric measures the time it takes to fill open positions, which can include the time it takes to advertise the position, screen candidates, and make a final decision.

3. Quality of hire: This metric measures the quality of new hires, which can include their performance, retention, and satisfaction.

4. Candidate experience: This metric measures the experience of candidates during the hiring process, which can include their satisfaction with the process and their likelihood to accept a job offer.

Learn More        OK

*FIG. 7*

AUTONOMOUS USER-DIRECTED INSIGHTS AND DASHBOARD RECOMMENDATIONS

FIELD

The present application generally relates to recommendation generation functionalities, and more particularly relates to generation of user-directed insights based on user interaction with data and related information to generate swift and accurate recommendations, including generation of recommended dashboards corresponding to respective action recommendations.

BACKGROUND

Application services, along with their providers, have become a fixture of modern culture. For example, application services are increasingly relied upon as data repositories, storing growing volumes of data and information spanning extensive subject matters, formats, and platforms. As the stores of data and information grow, it can become increasingly difficult for users to consume and parse through the data to identify and see big picture issues or observations. In other words, the data relevant to a user is often vast and dispersed across multiple subject matters, platforms, and repositories. As such, it may not be feasible for the user to cohesively view and appreciate larger trends or issues present in the data. Moreover, even if a user identifies an issue or observation, the issue may not be oriented from a viewpoint that is relevant to the user, such as tailored to the user's role or position within an organization.

Beyond identifying insights or observations present across large volumes of data, a user may not readily appreciate how to address an identified insight. Determining what information is relevant to the insight and how to format that information in an easily digestible manner can be time consuming and costly. For example, if an issue involves employee retention, the user may have to gather data and information relating to various employee records across numerous departments, applications, and platforms, analyze the employee information from a variety of dimensions, such as age, education level, department, etc., and then format the data into a single format, such as into a dashboard, to appreciate the various dimensions present in the data. This can be time and cost intensive.

As such, improved systems and techniques for identifying insights from large volumes of data and providing recommendations on how to address an identified insight are needed.

OVERVIEW

Technology is disclosed herein for providing user-directed insights and recommendations, including recommendations for a dashboard profile associated with a recommendation or information on how to create a dashboard profile. In an example embodiment, an insight engine may determine or gather usage tracking information for a first client device. The usage tracking information may indicate a client device's interaction with data, including documents and files, as well as user-based parameters relating to user information of a user associated with the client device. The insight engine may generate a user-directed insight based on the usage tracking information. The user-directed insight may be a natural language insight or observation of the client device's interaction with data. Following generation of the user-directed insight, a recommendation engine may generate one or more recommendations. In some cases, the recommendations may be generated based, in part, on the usage tracking information. In this manner, the recommendations can be tailored to the user of the client device. Included as part of a given recommendation is a recommendation response, which includes text describing information that may be relevant to the user for addressing the user-based insight. In addition to the recommendation response, the recommendation may also include a recommendation for a dashboard profile that matches the recommendation response and may be useful to the user for viewing information relating to the recommendation response. If no dashboard profile is identified, then the recommendation engine may generate a recommendation of dashboard components for creating a dashboard based on the recommendation.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 7 illustrates an example dashboard components prompt based on the user-directed insight provided in FIG. 4, according to an embodiment herein;

DETAILED DESCRIPTION

Figure 1:
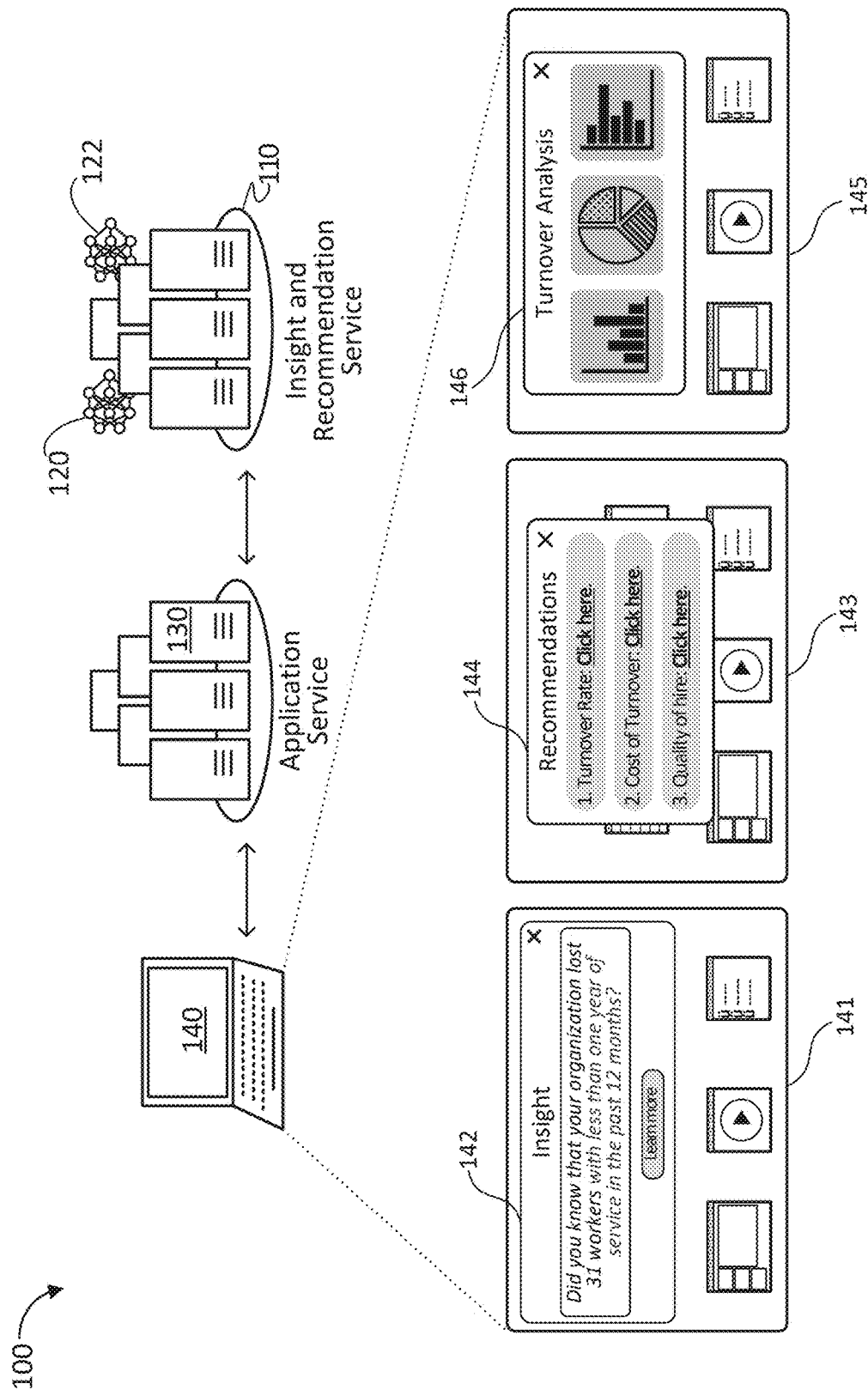
FIG. 1 illustrates an operational environment of a system for providing autonomous user-directed insights and recommendations, according to an embodiment herein.

Examples are described herein in the context of systems and methods for providing autonomous user-directed insights and recommendations. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

As noted above, application services are increasingly relied upon as data repositories, storing growing volumes of data and information spanning extensive subject matters, formats, and databases. Due to the growing volume of data, it can become increasingly difficult for users to consume and parse through the data to identify and see trends or observations within the data. Moreover, even if a user identifies an observation or trend in the data, the user may not readily appreciate the various dimensions or factors playing into that observation. For example, there may be numerous factors contributing to a trend or observation. As such, to appreciate and understand a trend or issue present in the data, a user may have to track down and gather information relating to each of the contributing factors.

To assist users with identifying and understanding issues present in large volumes of data, example systems and methods for providing autonomous user-directed insights and recommendations are provided herein. In an example, an insight engine may gather or receive usage tracking information relating to a user. The usage tracking information may include information regarding what data the user interacts with frequently or most recently. That is, the usage tracking information may include usage metrics associated with a given user, such as what data the user employs and how often that data is used. As used herein, data may be or include documents, metadata, text, software, or applications. In some embodiments, the usage tracking information may also include user-based parameters. For example, user-based parameters may include a job role or position, organization, office location, physical location, project assignments, and the like.

Upon receiving or gathering the usage tracking information, the insight engine may generate a user-directed insight. The user-directed insight may be an issue or observation identified by the insight engine within the data relevant to the user. Relevant data may be data that is relevant to the user based on the user-based parameters, such as the user's job role. Relevant data may also be data that is associated with the user, such as data that the user frequents or assigned to handle.

The user-directed insight may be provided to the user, as described in greater detail below. Along with providing the user-directed insight to the user, the user may be provided with an option to get recommendations based on the user-directed insight. If the user wishes to get recommendations, then a recommendation engine may generate recommendations based on the user-based insight. Recommendations generated by the recommendation engine may be suggestions on how to address the issue and what additional metrics or data to look at for more information related to the user-directed insight. In some embodiments, the recommendation engine may identify a recommended dashboard profile for viewing the data relating to the user-based insight. For example, if the user-based insight is for a Human Resource (HR) Director and states "your organization lost 31 workers with less than or equal to one year of service in the past 12 months," then the recommended dashboard profile may include graphs and informatics on the statistics of those 31 workers who left the organization. If the recommendation engine does not identify a dashboard profile based on the user-directed insight, then the recommendation engine may generate recommended dashboard components. That is, the recommendation engine may provide recommended components for a dashboard based on the user-directed insight.

As noted above, a benefit of the insight engine, and the respective user-directed insight generated therefrom, is that the insight engine can parse through vast quantities of data and information, determine which data is relevant to the user, and then provide a big picture or overview of an issue or observation that a user may otherwise not be able to appreciate. In other words, the data relevant to a user is often vast and dispersed across multiple areas and repositories. As such, it may not be feasible for the user to cohesively view and appreciate larger trends or issues present in the data. The insight engine is able to perform such an analysis and provide an insight or observation on the data for a respective user in the form of the user-directed insight.

With respect to the recommendation engine, a benefit of the recommendations generated and provided by the recommendation engine is that a user may be provided with potential solutions or steps for addressing the issue or observation identified in the user-directed insight. As such, a user is not simply informed of the issue without any further direction on how to address it. Moreover, by recommending a dashboard profile or dashboard components along with the recommendation data related to the user-directed insight is provided to the user in a consumable and effective format. As such, issues and trends present in large volumes of data can be easily identified, presented to a user from a viewpoint that is relevant to the user, and solutions to those issues provided with minimal to no input from the user.

As will be described in greater detail below, the user-directed insights and recommendations may be autonomously generated. As such, the systems and techniques discussed herein provide for improved and more efficient means of identifying and addressing issues, trends, or observations present in large volumes of data.

Turning now to the Figures, FIG. 1 illustrates operational environment 100 for a system providing user-directed insights and recommendations, according to an embodiment herein. As illustrated, the operational environment 100 includes an application service 130, an insight and recommendation service 110, and a computing or client device 140. The application service 130 hosts an application to endpoints such as the client device 140. The client device 140 executes applications locally that provide a local user experience and that interface with the application service 130. The applications running locally with respect to client device 140 may be natively installed and executed applications, browser-based applications, mobile applications, streamed applications, or any other type of application capable of interfacing with the application service 130 and providing a user experience, such as user experiences 141, 143, and 145 displayed on client device 140. Applications provided by the application service 130 may execute in a stand-alone manner, within the context of another application such as a presentation application or word processing application, with a spreadsheet functionality, or in some other manner entirely.

As described herein, the client device 140 is representative of a computing device, such as a laptop or desktop computer, or mobile computing device, such as a tablet computer or cellular phone, of which the computing device is broadly representative. The client device 140 communicates with application service 130 via one or more internets and intranets, the Internet, wired or wireless networks, local area networks (LANs), wide area networks (WANs), and any other type of network or combination thereof. A user may interact with one or more of the applications provided by the application service 130 using a user interface of the application displayed on client device 140. For example, as illustrated, a user may be provided with the user experiences 141, 143, and 145 when displayed on the client device 140. Prompts 142, 144, and 146 illustrate an exemplary user experience of an application environment for an application hosted by the application service 130, according to an embodiment herein. Specifically, the illustrated user experiences 141, 143, and 145, including the prompts 142, 144, and 146, are described in greater detail below with respect to FIGS. 4-6.

Figure 9:
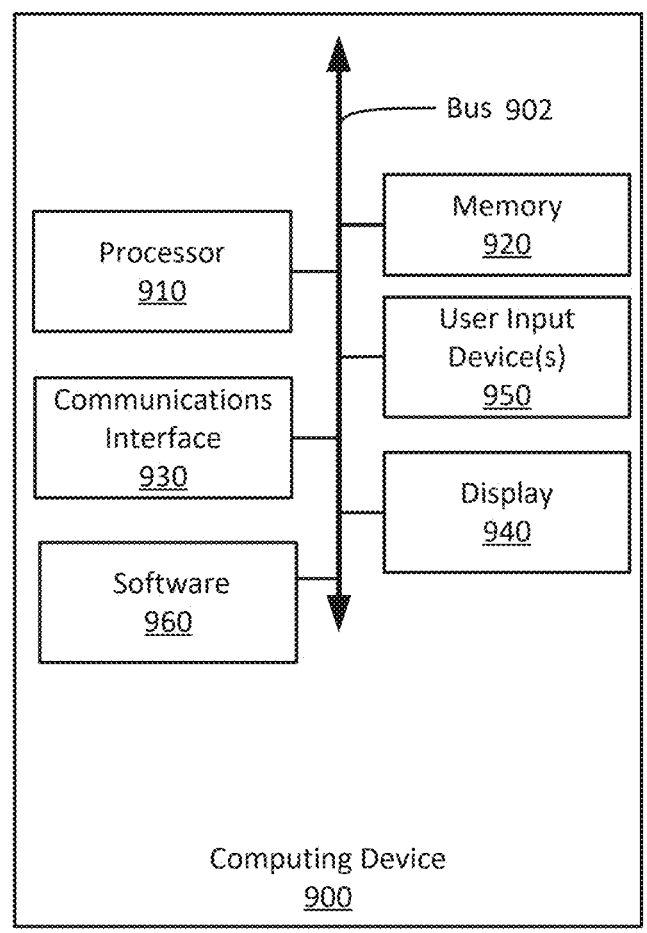
FIG. 9 shows an example computing device suitable for providing autonomous user-directed insights and recommendations, according to an embodiment herein.

The application service 130 is representative of one or more computing services capable of hosting an application and interfacing with the client device 140 and with insight and recommendation service 110. Generally, the application service 130 employs one or more server computers co-located or distributed across one or more data centers connected to the client device 140. Examples of such servers include web servers, application servers, virtual or physical (bare metal) servers, or any combination or variation thereof, of which the computing device 900 in FIG. 9 is broadly representative. The application service 130 may communicate with client device 140 via one or more internets, intranets, the Internet, wired and wireless networks, local area networks (LANs), wide area networks (WANs), and any other type of network or combination thereof. Examples of services or sub-services of the application service 130 include—but are not limited to—voice and video conferencing services, collaboration services, file storage services, and other application services. In some examples, the application service 130 may provide a suite of applications and services with respect to a variety of computing workloads such as office productivity tasks, email, chat, voice and video, and so on.

As provided herein, the insight and recommendation service 110 may provide one or more user-directed insight functions or recommendation functions. For example, the insight and recommendation service 110 may host one or both of an insight engine 120 and a recommendation engine 122. As such, the insight and recommendation service 110 may be representative of one or more computing services capable of hosting an LLM computing architecture and communicating with application service 130. The insight and recommendation service 110 may be implemented in the context of one or more server computers co-located or distributed across one or more data centers. In some embodiments, the insight and recommendation service 110 may be hosted by the same provider as the provider for the application service 130, while in other embodiments, the insight and recommendation service 110 may be hosted by a third party.

As noted above, the insight and recommendation service 110 may host one or both of the insight engine 120 and the recommendation engine 122. The insight engine 120 and the recommendation engine 122 may include or be representative of a deep learning AI model, such as BERT, ERNIE, T5, XLNet, or of a generative pretrained transformer (GPT) computing architecture, such as GPT-3®, GPT-3.5, ChatGPT®, or GPT-4. In an exemplary embodiment, the insight engine 120 includes Cohere®. For example, the insight engine 120 may be executed by or in association with a user's interaction a user interface for an application hosted by the application service 130. The insight engine 120 may include an artificial intelligence (AI) or machine learning model (not shown) that analyzes a user's interaction with one or more applications hosted by the application service 130 and provides a user-directed insight. The user's interaction with the applications hosted by the application service 130 may be described herein as usage tracking information. Usage tracking information may include information, such as metadata, relating to what data or documents a user frequently interacts with and the type of interaction. As will be described in greater detail below, the insight engine 120 may tailor the user-directed insight based on information relating to the user, such as the user-based parameters described herein.

The recommendation engine 122 may also be executed by or in association with a user's interaction with a user interface for an application hosted by the application service 130. Similar to the insight engine 120, the recommendation engine 122 may also include or employ an AI or machine learning model. Specifically, the recommendation engine 122 may employ an AI or machine learning model to generate recommendations for a user based on the user-directed insight. In some cases, the recommendations may also be tailored to the user and as such the recommendations may also be generated based on the user's usage tracking information.

In an illustrative example, a user of the client device 140 interacts with the application service 130 via a user interface displaying one or more of the user experiences 141, 143, and 145. That is, the user may be provided with the user experiences 141, 143, and 145 via an application environment provided by the application service 130. As illustrated in the user experiences 141, 143, and 145, the application environment displays icons representing a suite of applications such as a suite of productivity applications. The suite of productivity applications may include applications such as a word processing application, a spreadsheet application, a presentation application, a collaborative application, an email application, a notetaking or checklist application, an illustration application, and so on.

Continuing the above illustrative example, when the user experience 141 is provided to the user via a display on the client device 140, the user may be prompted with the prompt 142. The prompt 142 provides a user-directed insight, surfacing an observation or insight generated by the insight engine 120. If the user desires to learn more about the user-directed insight provided via the prompt 142, the user may provide such an indication. Upon receiving user input of the indication, the application service 130 may communicate with the insight and the recommendation service 110 for generation of recommendations based on the user-directed insight. As will be described in greater detail with respect to FIGS. 2 and 3, the recommendation engine 122, responsive to the user's input, generates recommendations based on the user-directed insight. Once generated, the recommendations may be displayed to the user via the prompt 144, as illustrated by the user experience 143.

Each of the recommendations may provide an option for the user to view a recommendation for a dashboard profile associated with a recommendation or be provided with a recommendation for creating a dashboard associated with a recommendation. If the user selects the option associated with a given recommendation, the prompt 146 may be provided to the user, as illustrated by the user experience 145. The prompt 146 may be generated by the recommendation engine 122, responsive to a user's input with the option provided via the prompt 144. A more detailed description of the insight and recommendation service 110, including the insight engine 120 and the recommendation engine 122, is provided in FIGS. 2 and 3, and the related discussion.

Figure 2:
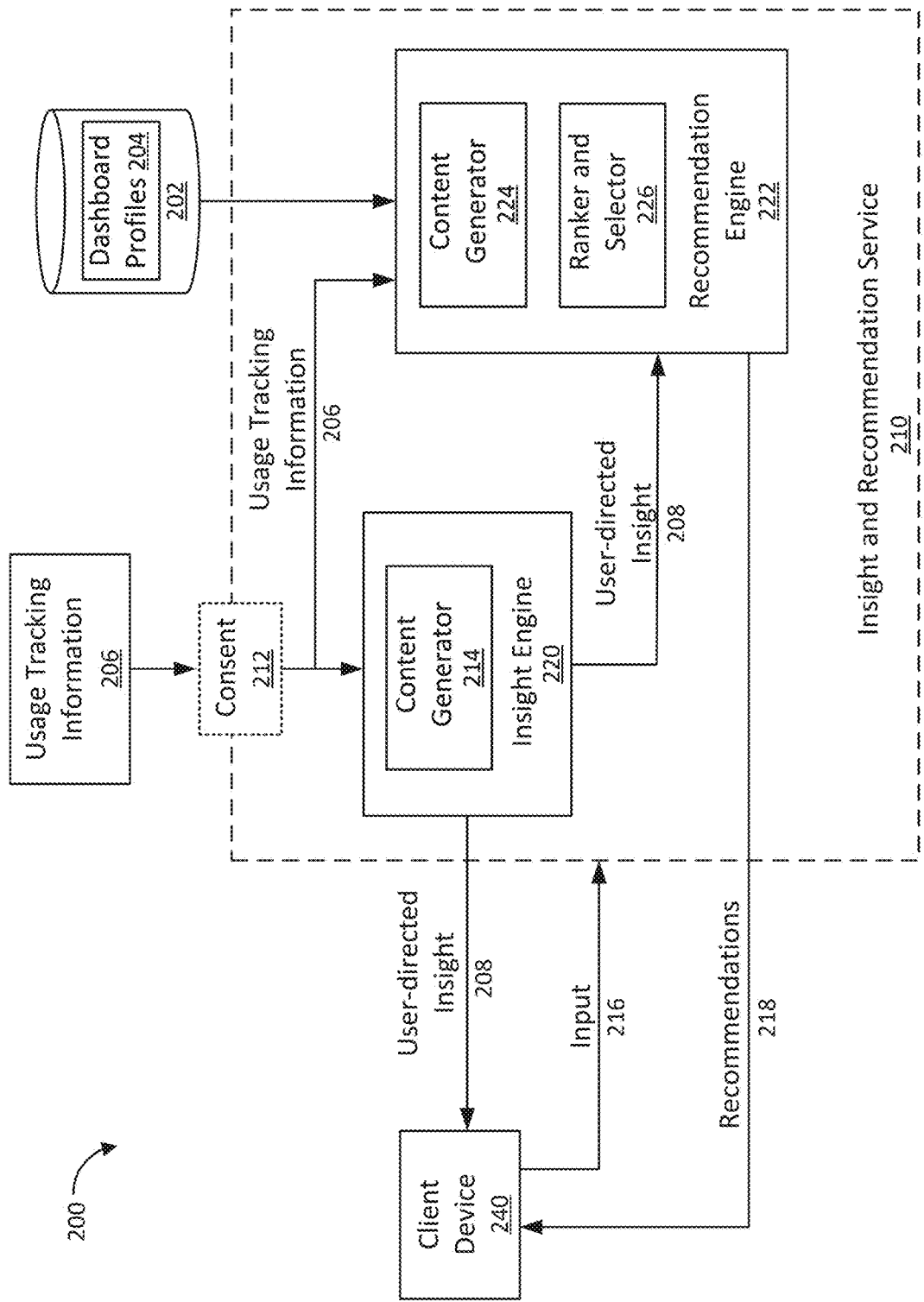
FIG. 2 illustrates an example system for providing autonomous user-directed insights and recommendations including an insight engine and a recommendation engine, according to an embodiment herein.

Referring now to FIG. 2, FIG. 2 illustrates an example system 200 for providing autonomous user-directed insights and recommendations, according to an embodiment herein. As shown, the system 200 may include an insight and recommendation service 210. The insight and recommendation service 210 may be the same or similar to the insight and recommendation service 110, described above with reference to FIG. 1. For example, the system 200 may include a client device 240, which may be the same as the client device 140, that connects with the insight and recommendation service 210 using one or more of the methodologies as described above.

To provide the user-directed insights and recommendations, the insight and recommendation service may include an insight engine 220 and a recommendation engine 222. That is, the insight engine 220 may generate the user-directed insights and the recommendation engine 222 may generate the recommendations. As will be described in greater detail below, the recommendations generated by the recommendation engine 222 may be based, in part, on the user-directed insight. As such, the insight engine 220 may first generate a user-directed insight and then the recommendation engine 222 may generate the recommendations therefrom. It should be noted that although the insight engine 220 and the recommendation engine 222 are illustrated as part of the insight and recommendation service 210, one or both of the engines 220 and 222 may be hosted by a third party.

To generate a user-directed insight, the insight engine 220 may receive or gather usage tracking information 206. The usage tracking information 206 may be specific to a client device, such as the client device 240. For example, the usage tracking information 206 may include usage metrics relating to what data the client device 240 interacts with and how the client device 240 interacts with that data. Following the above example involving the HR Director, usage metrics may include what employment records the HR Director frequents, how often the HR Director frequents certain records or documents, what analytics the HR Director use, etc. As can be appreciated, usage metrics can provide information on what data is relevant to the client device 240 during a given snapshot in time. That is, the more recent and frequently that a client device 240 accesses data, the more likely that that data is relevant to the client device 240 at the time that the user-directed insight is generated by the insight engine 220.

In some embodiments, the usage tracking information 206 may include one or more user-based parameters. User-based parameters may include a job role or position, organization, office location, physical location, project assignments, and the like. In some embodiments, the user-based parameters may be pulled from the client device 240's profile with the insight and recommendation service or a profile through which the client device 240 accesses the data stored or hosted by the insight and recommendation service. The insight engine 220 may use the one or more user-based parameters in generating the user-directed insight 208 to limit the scope of data analyzed to only data that is relevant to the user. For example, if the user is the HR Director, then a user-based parameter may be the user's role as the HR Director. The insight engine 220 may then limit the data for generation of the user-directed insight 208 to only data relevant to the HR Director. That is, the insight engine 220 may not use data associated with the engineering department when generating the user-directed insight 208 because such data is not relevant to the HR Director.

Optionally, the insight engine 220 may generate the user-directed insight 208 using usage tracking information 206 for a second client device. That is, the user-directed insight 208 may be generated for the client device 240 using both the usage tracking information 206 for the client device 240 and the usage tracking information 206 for a second client device (not shown). In some embodiments, the second client device may be identified due to one or more of the user-based parameters being the same or similar to the user-based parameters for the client device 240. Following the above example, a user-based parameter for the client device 240 may be the role of a HR Director. The second client device may also have a role within the HR department, such as the HR Assistant Director. Due to the similarity of this user-based parameter, the insight engine 220 may identify and use the usage tracking information 206 for the second client device in generating the user-directed insight 208 for the client device 240. Although this example only describes the use of usage tracking information 206 for a second client device, it should be appreciated that the usage tracking information 206 for two or more client devices could be used when generating the user-directed insight 208 for the client device 240.

In some embodiments, as part of receiving or gathering the usage tracking information 206 by the insight engine 220, the client device 240 (and other client devices whose usage tracking information is used to generate the user-directed insight 208) may first provide consent 212. That is, the client device 240 may be prompted to provide consent 212 for using one or more programs hosted by the insight and recommendation service. As would be appreciated by those skilled in the art, the consent 212 may allow the insight engine 220, and functions therein, to use data associated with the client device 240, such as the usage tracking information 206 for the client device 240, for generation of the user-directed insight 208. In some embodiments, the consent 212 may also allow the insight engine 220 to use the usage tracking information 206 associated with the client device 240 for generation of a user-directed insight for another client device that is separate and not associated with the client device 240. Examples may include using information from a user's profile or a profile associated with the client device 240 for generation of the user-directed insight 208 or a user-directed insight for a second client device. The consent 212 may provide the insight engine 220 authorization to use data associated with the client device 240 as part of a neural network training or machine learning process. For example, usage tracking information 206 or the user-directed insight 208 generated by the insight engine 220 may be used as part of a training process of the insight engine 220. The consent 212 may be for one or more functions or components of the system 200, or for all functions or components of the insight and recommendation service.

Upon receiving or gathering the usage tracking information 206, the insight engine 220 may generate a user-directed insight 208. To generate the user-directed insight 208, the insight engine 220 may include a content generator 214. The content generator 214 may include one or more deep learning algorithms that can perform a variety of processing tasks. For example, the content generator 214 may be or include a language model, such as a large language model. In some embodiments, the content generator 214 may be or employ artificial intelligence (AI), such as one or more neural network models. For example, the content generator 214 may include one or more generative pre-training transformers (GPTs).

Once the user-directed insight 208 is generated, the user-directed insight 208 may be provided to the client device 240. For example, the insight and recommendation service may transmit the user-directed insight 208 to the client device 240. The user-directed insight 208 may be presented to the client device 240 as a prompt on a GUI, such as the GUI described in greater detail below with respect to FIG. 4.

Upon receiving the user-directed insight 208, the client device 240 may be provided with one or more selections to learn more about the user-directed insight 208. Upon making a selection, the client device 240 may transmit input 216 to the insight and recommendation service. As will be described in greater detail below with respect to FIGS. 3-7, responsive to receiving the input 216 from the client device 240, the recommendation engine 222 may generate one or more recommendations 218 based on the user-directed insight 208. That is, once the insight and recommendation service 210 receives the input 216 from the client device 240, the user-directed insight 208 may be provided to the recommendation engine 222. In some embodiments, in addition to the user-directed insight 208, the usage tracking information 206 may also be provided to the recommendation engine 222.

Upon receiving the user-directed insight 208, and optionally the usage tracking information 206, the recommendation engine 222 may generate one or more recommendations 218. The recommendations 218 may include suggestions for addressing the user-directed insight 208, such as metrics or information to consider. In some embodiments, the recommendations 218 may include a dashboard profile recommended to view information relating to the user-directed insight 208. To determine a dashboard profile for the user-directed insight 208, the recommendation engine 222 may receive one or more of dashboard profiles 204. The dashboard profiles 204 may be received from a dashboard database 202. The dashboard database 202 may be hosted by the insight and recommendation service or maybe hosted by a third party. Recommendations, including the dashboard profiles, are described in greater detail with respect to FIGS. 5-7.

The recommendation engine 222 may include a content generator 224 and a ranker and selector 226. The content generator 224 may be the same or similar to the content generator 214. As such, the content generator 224 may include a language model or one or more GPTs. As will be expanded on below, the content generator 224 may generate the one or more recommendations 218 based on the user-directed insight 208. Each recommendation may include a recommendation response and a dashboard recommendation. The recommendation response may be text that provides a recommendation in a natural language form. A natural language form may be understood as a statement made in a user's day-to-day vernacular. The dashboard recommendation may be a recommendation for a dashboard profile associated with the recommendation response or a recommendation for what dashboard components should be present in a dashboard based on the recommendation response.

To determine whether a dashboard profile exists for the generated recommendation response, the ranker and selector 226 may analyze a plurality of dashboard profiles associated with a recommendation response. That is, the recommendation engine 222 may determine the plurality of dashboard profiles based on parameters associated with the recommendation response. Then, the ranker and selector 226 may determine the relevancy of each of the dashboard profiles to the recommendation response and select the dashboard profile with the greatest relevancy or accuracy to the recommendation response. For example, if a recommendation response is for an employee turnover rate, parameters for the recommendation response may include "employee" and "turnover rate." In some embodiments, parameters for the recommendation response may also include data from the usage tracking information 206, such as the one or more of the user-based parameters. In such cases, the parameters for the recommendation response may also include "HR department." In this manner, the identified dashboard profiles are limited to those that are relevant to the client device 240.

To determine which dashboard profile has the greatest relevancy to the response recommendation, the ranker and selector 226 may compare each of the dashboard profiles to a ranking threshold. For example, a comparison may be made between each of the dashboard profiles and the parameters of the response recommendation. A ranking threshold may require 80% of the parameters be matched with a dashboard profile to be determined as relevant to the response recommendation. If a dashboard profile does not match at least 80% of the parameters of the response recommendation, then the ranker and selector 226 may return a no-match result. As can be appreciated, the ranking threshold may be set or selected to be any threshold matching value, such as 50%, 60%, 70%, 80%, 90%, or even 100% match between the dashboard profile and the parameters of the response recommendation. The recommendation engine 222 may select the ranking threshold, while in other embodiments the insight and recommendation service or even the client device 240 may select the raking threshold. Moreover, it should be appreciated that each of the dashboard profiles may be ranked and selected via a different methodology, such as one that does not include a ranking threshold.

Once the recommendations 218 are generated by the recommendation engine 222, the recommendations 218 may be transmitted to the client device 240. The recommendations 218 may be provided to the user in a recommendation prompt, such as the recommendation prompt described in greater detail below with respect to FIG. 5.

Figure 3:
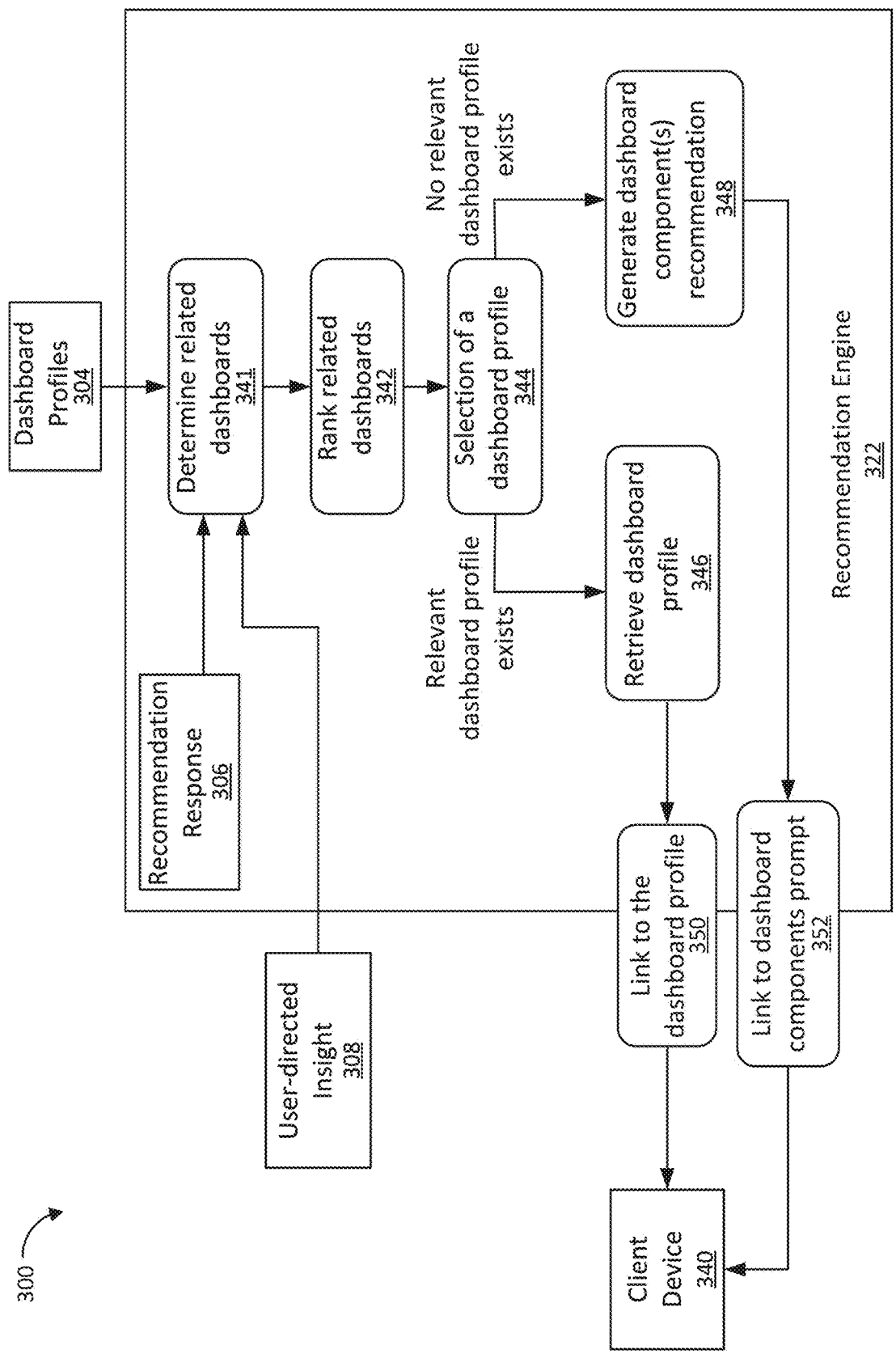
FIG. 3 illustrates an example flow diagram for providing autonomous user-directed insights and recommendations, according to an embodiment herein.

Turning now to FIG. 3, an example flow diagram 300 for providing the recommendations, such as the recommendations 218, is provided, according to an embodiment herein. For ease of discussion, diagram 300 may be described with reference to FIG. 2, however, it should be appreciated that systems and components from any other figure described herein may also be used as part of diagram 300.

As noted above, the diagram 300 may illustrate an example method for generating recommendations 218 for a client device 340. The client device 340 may be the same or similar to the client device 240. Specifically, the diagram 300 illustrates a method for determining a dashboard profile for each of the recommendations 218. For ease of explanation, the following discussion will describe recommendations 218 as including two recommendations: a first recommendation and a second recommendation. It should be appreciated, however, that the recommendations 218 may include any number of recommendations, such as more than 2 recommendations, more than 5 recommendations, or more than 10 recommendations. In some embodiments the recommendations 218 may only include a single recommendation.

The diagram 300 may include steps 340-348. At the first step 341, the recommendation engine 322 may determine related dashboard profiles for each of the recommendation responses. As described above, the recommendation engine 322 may generate one or more recommendation responses 306 based on the user-directed insight 308. The user-directed insight 308 may be the same or similar to the user-directed insight 208. The user-directed insight 308 may be generated based off of usage tracking information associated with the client device 340. Since the present example includes two recommendations 218, then the recommendation engine 322 may generate two recommendation responses 306.

As part of determining related dashboard profiles for each of the recommendation responses 306, the recommendation engine 322 may also use the user-directed insight 308, and in some embodiments, the usage tracking information 206. For example, the recommendation engine 322 may identify a plurality of dashboard profiles from the dashboard profiles 304, which may be the same or similar to the dashboard profiles 204. Following the above example, the plurality of dashboard profiles determined at step 341 may each relate to "turnover rates."

At step 342, each of the dashboard profiles may be ranked to determine the relevancy of each of the dashboard profiles. Step 342 may be performed by the ranker and selector 226. As described above, the recommendation engine 322 may determine one or more parameters relating to a given recommendation response 306. For example, the first recommendation response 306 may include a first set of parameters and the second recommendation response 306 may include a second set of parameters. Then each set of parameters may be compared to each of the dashboard profiles to determine the relevancy of the dashboard profile to the recommendation response 306. The dashboard profiles may then be ranked based on their relevancy to the recommendation response 306.

At step 344, a determination may be made of whether a dashboard profile exists that is relevant to the recommendation response 306. As described above, this determination may be made using a ranking threshold. That is, each of the dashboard profiles may be compared to the parameters of the response recommendation 306 and the relevancy of each of the dashboard profiles may be determined at 342. Then, at step 344 a selection is made of the dashboard profile having the highest relevancy (the "relevant dashboard profile"). In other words, the dashboard profile having the greatest number of matches with the parameters of the response recommendation 306 may be selected for having the highest relevancy. For example, if a relevant dashboard profile is determined at 342 as having the highest rank (e.g., greatest match with the first set of parameters with the first response recommendation 306), then the relevant dashboard profile may be selected at step 344. At step 346, the relevant dashboard profile may be retrieved. The relevant dashboard profile may be stored in a dashboard database, such as the dashboard database 202. Retrieving the relevant dashboard profile may include generating a link, such as a URL, for accessing the relevant dashboard profile. Then, at step 350, the link to the dashboard profile may be transmitted to the client device 340. In some embodiments, the link to the dashboard profile may be provided to the client device 340 as part of the recommendations 218.

If at step 344, it is determined that no relevant dashboard profile exists, then the recommendation engine 322 may generate dashboard components that are relevant to the recommendation response 306 and the user-directed insight 308. For example, if for the second recommendation response 306, none of the plurality of dashboard profiles match the parameters of the second response recommendation 306 such to indicate a match above the ranking threshold, then a no-match result may be generated by the recommendation engine 322. The no-match result may be generated at step 344.

If a no-match result is generated, then there may be no relevant dashboard profile. As such, the method may continue to step 348. At step 348, the recommendation engine 322 may generate dashboard components based on the second recommendation response 306 and the user-directed insight 308. For example, the recommendation engine 322 may submit the second recommendation response 306 to the content generator 224 to generate a recommendation of dashboard components for the second response recommendation 306 and the user-directed insight 308. In other words, the content generator 224 generates a recommendation of what dashboard components should be present in a dashboard profile for the second response recommendation 306 based on the user-directed insight 308. In some embodiments, the recommendation of dashboard components may also be based on the usage tracking information 206.

At step 352, a link may be provided to the client device 340 for the dashboard components. For example, the link may be to a prompt including the recommended dashboard components. Such an example is described in greater detail below with respect to FIG. 7.

Figure 4:
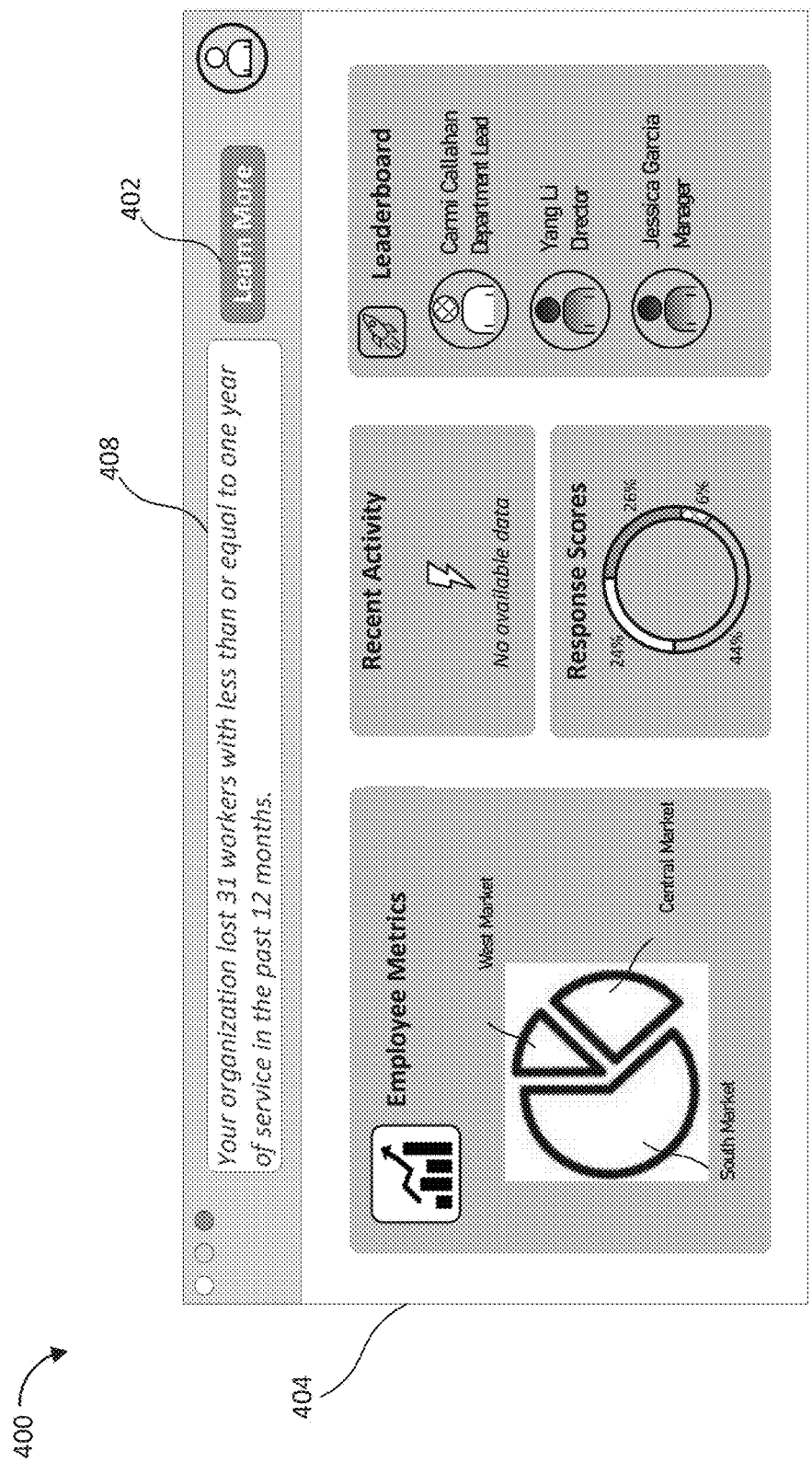
FIG. 4 illustrates a graphical user interface (GUI) providing a user-directed insight, according to an embodiment herein.

Referring now to FIG. 4, an example GUI 400 providing a user-directed insight is provided, according to an embodiment herein. As illustrated, the GUI 400 may include a user-directed insight 408. The user-directed insight 408 may be the same or similar to the user-directed insights 208 or 308. The user-directed insight 408 may be presented to a user via the GUI 400 when the user navigates to one or more pages provided by an application service, such as the application service 130. For example, the user-directed insight 408 may be provided when a user navigates to a homepage 404.

The user-directed insight 408 may be generated by an insight engine, such as the insight engine 220. The user-directed insight 408 may be based off the usage tracking information 206 associated with the client device 240, as described above. Following the above example, the user may be the HR Director for an organization and the user-directed insight 408 may provide the observation that "Your organization lost 31 workers with less than or equal to one year of service in the past 12 months." In this example, the organization may be a large organization, including several departments and offices. As such, the HR Director may not be able to appreciate this observation from the data stored or hosted by the insight and recommendation service without spending excessive time and/resources. As such, the user-directed insight 408 may provide the user with an observation that the user may not otherwise of been able to appreciate.

Along with presenting the user-directed insight 408, the GUI 400 also provides a button 402 to "learn more" about the user-directed insight 408. Upon selecting the button 402, the input 216 may be received by the insight and recommendation service and the recommendations 218 may be generated based on the user-directed insight 408.

Figure 5:
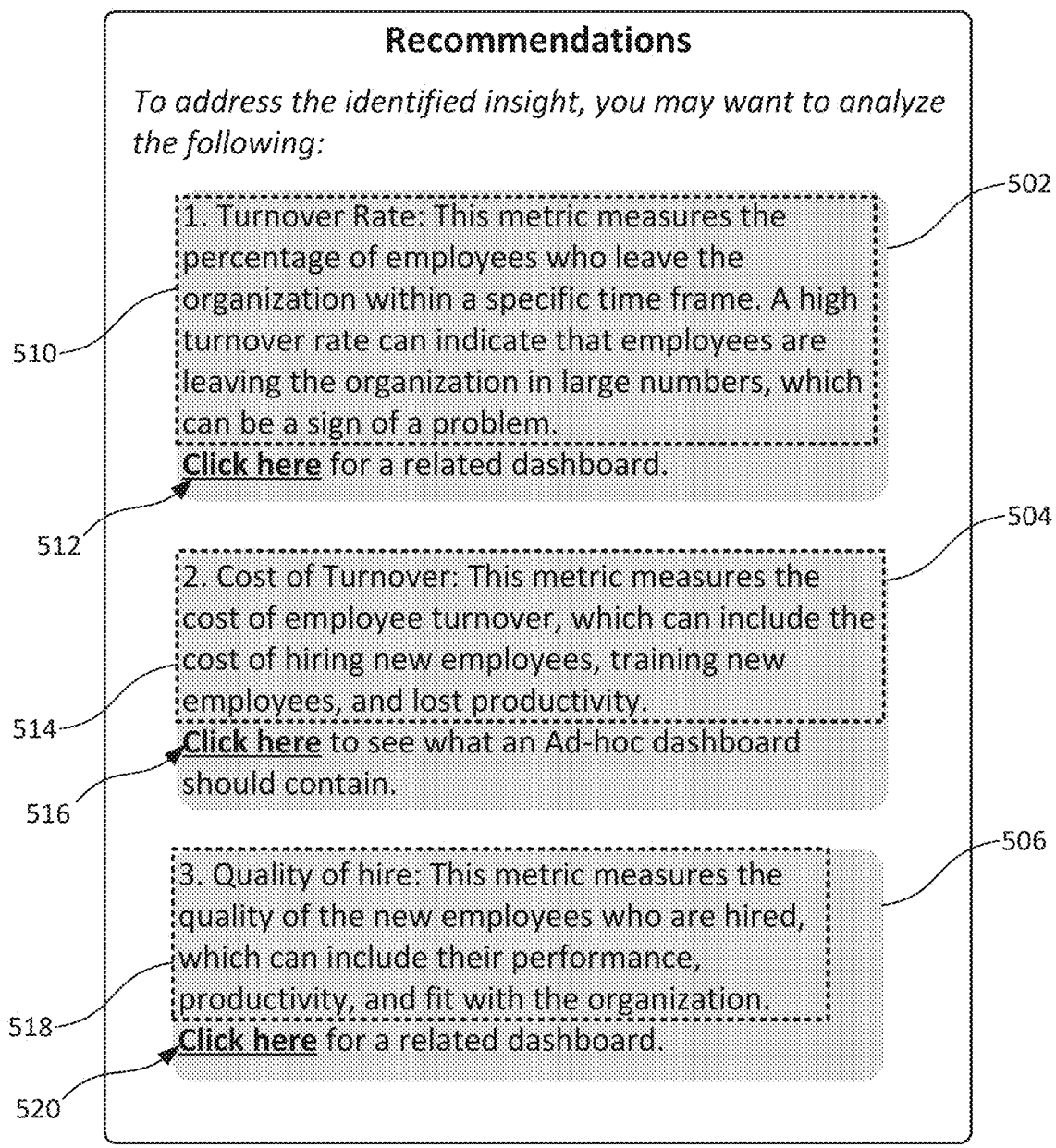
FIG. 5 illustrates an example recommendation prompt providing recommendations based on the user-directed insight provided in FIG. 4, according to an embodiment herein.

Referring now to FIG. 5, an example recommendation prompt 500 is provided, according to an embodiment herein. The recommendation prompt 500 may be provided to a client device, such as the client device 240, in response to selection of the button 402. The recommendation prompt 500 may include three recommendations based on the user-directed insight 408. As illustrated the recommendation prompt 500 may include a first recommendation 502, a second recommendation 504, and a third recommendation 506. Each of the recommendations 502-506 may include a recommendation response 510, 514, and 515, respectively. The response recommendations 510-514 may include the text portion of the recommendation in which a natural language recommendation is provided. In addition to the response recommendations 510, 514, and 518, each of the recommendations 502-506 may include a recommendation for creating a dashboard corresponding to the user-directed insight 408. The recommendation for creating a corresponding dashboard may include a link to a related dashboard profile or a link for recommendations on dashboard components that should be in a dashboard corresponding to the user-directed insight 408.

As illustrated, the first recommendation 502 may include the recommendation response 510 and the link 512 to a related dashboard profile, the second recommendation 504 may include the recommendation response 514 and the link 516, and the third recommendation 506 may include the recommendation response 518 and the link 520 to a related dashboard profile. Because the first recommendation 502 and the third recommendation 506 include the links 512 and 520, respectively, that each link to a related dashboard profile, this may indicate that a dashboard profile for each of the recommendation responses 510 and 518 were identified by the recommendation engine 222. In contrast, because the second recommendation 504 includes the link 516 to recommended dashboard components, this may indicate that the recommendation engine 222 determined a no-match result for the dashboard profiles, meaning that no dashboard profile was identified as relevant or matching to the recommendation response 514.

Figure 6:
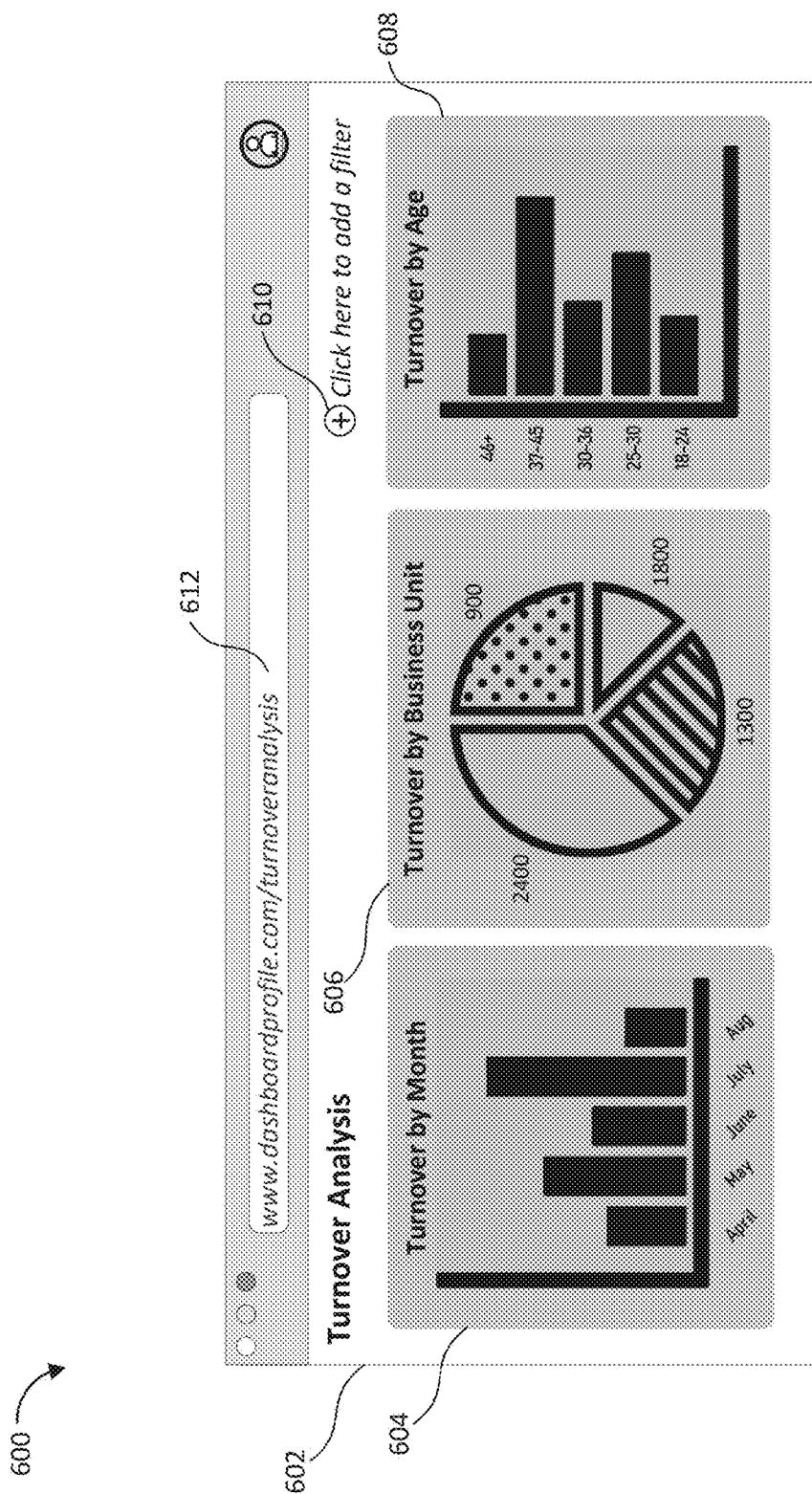
FIG. 6 illustrates an example dashboard profile recommended based on the user-directed insight provided in FIG. 4, according to an embodiment herein.

Upon selection of any of the links 512, 516, or 520, the client device 240 may be directed to the corresponding prompt, webpage, or file. Referring now to FIG. 6, if a user selects the link 512, the user may be provided with the GUI 600. The GUI 600 illustrates an example dashboard profile 602. The dashboard profile 602 may provide one or more components 604, 606, and 608. Each of the components 604-608 may provide a graphic, informatic, or data relating to the recommendation response 510. In some embodiments, the components 604-608 may be blank or have placeholder data populated therein. However, in other embodiments, the components 604-608 may be populated to include data relating to the recommendation response 510, and optionally, the user-directed insight 408 and/or the usage tracking information.

In some embodiments, the dashboard profile 602 may include options to allow a user to modify the components 604-608, including the data used to generate or populate the components 604-608. For example, as illustrated, the dashboard profile 602 may include a selection 610 to filter the data used to populate the components 604-608. Additionally, in embodiments, where the dashboard profile 602 is provided to the client device 240 via the internet or an intranet, the dashboard profile 602 may include a URL. This can allow the user to revisit the dashboard profile 602 at a later time or to share the dashboard profile 602 with another client device.

Referring now to FIG. 7, if a user selects the link 516 for the second recommendation 504, the user may be provided with an example dashboard components prompt 700 (hereinafter "prompt 700"). As illustrated, the prompt 700 may provide a dashboard components recommendation 702 which outlines one or more recommended dashboard components. Each of the listed recommended dashboard components may be a component or metric for effectively viewing data relating to the recommendation response 506 if the user were to generate a dashboard relating to the recommendation response 506.

In some embodiments, the prompt 700 may include a button 704 that allows the user to learn more. For example, in some cases, if the user selects the button 704, a user may be directed to a dashboard template (not shown). This can allow a user to begin generating a dashboard based off of the dashboard components recommendation 702. Once the user has viewed the prompt 700 and desires to return to the recommendation prompt 500, the user may select the button 706.

Figure 8:
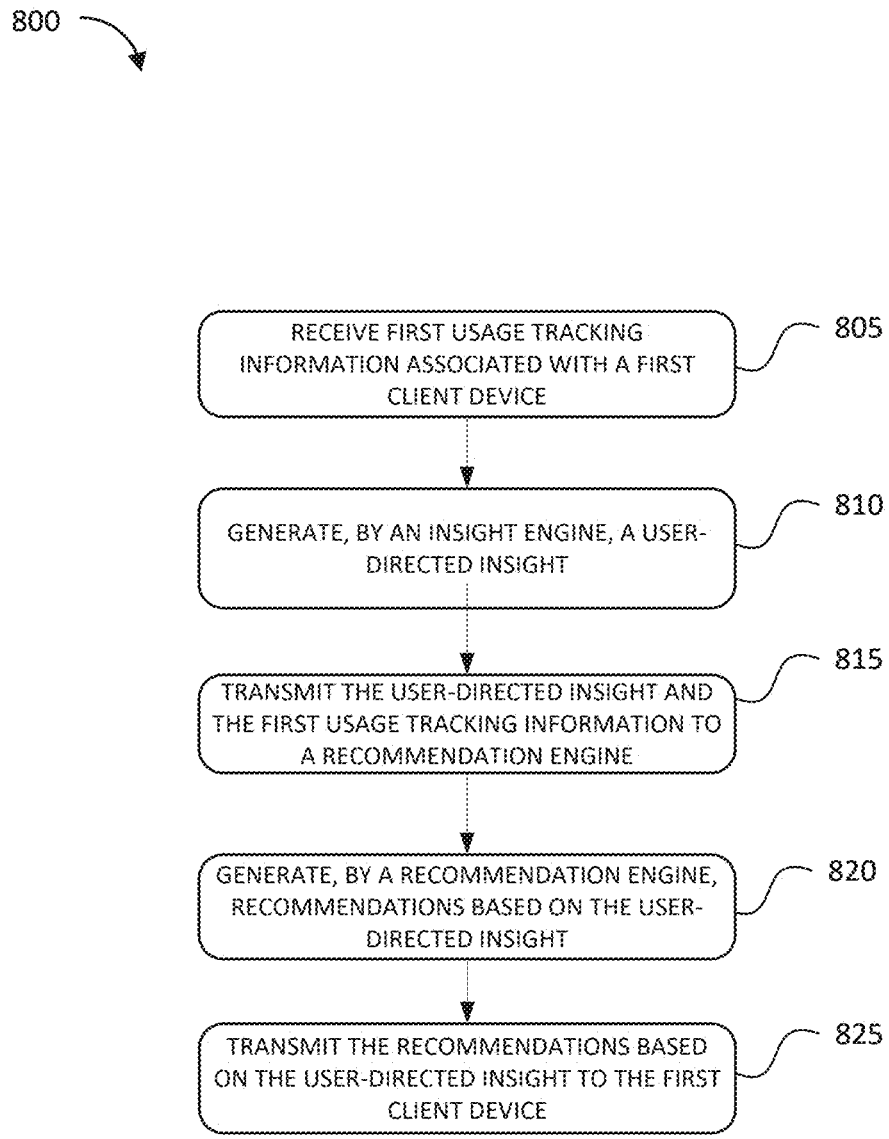
FIG. 8 illustrates an exemplary method for providing autonomous user-directed insights and recommendations, according to an embodiment herein.

Referring now to FIG. 8, an example method 800 for providing autonomous user-directed insights and recommendations is provided, according to an embodiment herein. As should be appreciated, the method 800 is an illustrative example method and as such one or more of the steps may be removed, rearranged, or repeated in other embodiments.

The method 800 includes step 805. At step 805, an insight engine, such as the insight engine 120, may receive first usage tracking information. The first usage tracking information may be associated with a first client device, such as the client device 140. As described above, first usage tracking information may include first usage metrics, such as data frequented by a user and frequency information, and first user-based parameters associated with the first client device, such as information (e.g., role, position, office, location) on a user associated with the first client device.

Upon receipt of the first usage tracking information, the insight engine may generate a user-based insight, at step 810. The user-based insight may include a natural language insight. A natural language insight may mean that the user-based insight is phrased or described in the user's natural language or vernacular. In some embodiments, the insight engine may determine second usage tracking information associated with a second client device and generate the user-directed insight based on both the first usage tracking information and the second usage tracking information. In other words, the insight engine may take into account usage tracking information for other users when generating the user-directed insight for the first client device. As can be appreciated, it may be beneficial to take into account what data peers or colleagues are interacting with to generate an insight for the user of the first client device. As such, the method 800 may include determining, by the insight engine, that the first usage tracking information includes one or more of the first metrics associated with the first client device and the first user-based parameters associated with the first client device. The insight engine may then determine that the second usage tracking information includes one or more of the first usage metrics or the first user-based parameters associated with the first client device.

At step 815, the insight engine may transmit the user-directed insight and the first usage tracking information to a recommendation engine, such as the recommendation engine 122. In some embodiments, the insight engine may transmit the user-directed insight to the recommendation engine responsive to input from a user, such as the user selecting the button 402.

Responsive to receiving the user-directed insight and the first usage tracking information, the recommendation engine may generate one or more recommendations, at step 820. The recommendations may be generated based on the user-directed insight and the first usage tracking information. For example, the user-directed insight and the first usage tracking information may be submitted to the content generator 224, which may in turn generate two or more recommendations. Each of the recommendations may include a recommendation response and one or more of (1) a recommendation for a dashboard profile or (2) a recommendation for creating a dashboard. In some embodiments, the recommendation for the dashboard profile may include a link to the dashboard profile. Similarly, the recommendation for creating a dashboard may include a link to a prompt providing a listing of dashboard components that should be included in a dashboard profile corresponding to the recommendation response.

As described above, the dashboard profile may be a dashboard profile corresponding to the recommendation that is selected by the ranker and selector 226. In such an example, step 820 may include determining, by the recommendation engine, one or more parameters associated with the first recommendation response and the user-directed insight and determining, by the recommendation engine, one or more dashboard profiles based on the parameters associated with the first recommendation response and the user-directed insight. The recommendation engine may rank the dashboard profiles based on relevancy to the first recommendation response and the user-directed insight. Based on the ranking, the recommendation engine may then select one of the dashboard profiles and associate that dashboard profile with the recommendation response.

If the recommendation engine determines a no-match result for a recommendation response based on the ranking of the dashboard profiles, the recommendation response may be resubmitted to the recommendation engine requesting a recommendation for dashboard components that should be present in a dashboard profile corresponding to the recommendation response. Specifically, the recommendation response may be submitted to the content generator 224 for generation of the recommended dashboard components. In some embodiments, the first usage tracking information is also submitted to the content generator 224 for generation of the recommended dashboard components.

At step 825, the method 800 includes transmitting the recommendations to the first client device. The recommendations may be transmitted to the first client device via application services, such as the application service 130. Upon receipt of the recommendations, the user may interact with the recommendations, such as described above with respect to FIG. 5-7.

Referring now to FIG. 9, FIG. 9 shows an example computing device 900 suitable for use in example systems or methods for providing autonomous user-directed insights and recommendations, as described herein. The example computing device 900 includes a processor 910 which is in communication with the memory 920 and other components of the computing device 900 using one or more communications buses 902. The processor 910 is configured to execute processor-executable instructions stored in the memory 920 to perform one or more methods for providing autonomous user-directed insights and recommendations, such as part or all of the example method 800, described above with respect to FIG. 8. For example, software 960 provided on the computing device 900 may provide instructions for performing one or more steps of the method 800 for providing autonomous user-directed insights and recommendations. The computing device, in this example, also includes one or more user input devices 950, such as a keyboard, mouse, touchscreen, video input device (e.g., one or more cameras), microphone, etc., to accept user input. The computing device 900 also includes a display 940 to provide visual output to a user.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: determine, by an insight engine, first usage tracking information associated with a first client device; generate, by the insight engine, a user-directed insight based on the first usage tracking information associated with the first client device, wherein the user-directed insight comprises a natural language insight; generate, by a recommendation engine, a plurality of recommendations based on the user-directed insight and the first usage tracking information, wherein each of the plurality of recommendations comprises a recommendation response and one of: a recommendation for a dashboard profile corresponding to the user-directed insight; or a recommendation for creating a dashboard corresponding to the user-directed insight; and transmit, to the first client device, the plurality of recommendations based on the user-directed insight to the first client device.

Example 2 is the system of any previous or subsequent example, wherein the plurality of recommendations comprises a first recommendation; the processor is further configured to execute processor-executable instructions stored in the non-transitory computer-readable medium to responsive to receiving an input associated with the user-directed insight, transmit the user-directed insight to a content generator within the recommendation engine; and the processor-executable instructions to generate, by the recommendation engine, the plurality of recommendations based on the user-directed insight and the first usage tracking information cause the processor to further execute processor-executable instructions stored in the non-transitory computer-readable medium to: generate, by the content generator within the recommendation engine, a first recommendation response based on the user-directed insight and the first usage tracking information; determine, by the recommendation engine, a first dashboard profile based on the first recommendation response; and generate, by the recommendation engine, the first recommendation comprising the first recommendation response and a link to the first dashboard profile from the recommendation response.

Example 3 is the system of any previous or subsequent example, wherein the processor-executable instructions to generate, by the recommendation engine, the first dashboard profile based on the first recommendation response cause the processor to further execute processor-executable instructions stored in the non-transitory computer-readable medium to: determine, by the recommendation engine, one or more parameters associated with the recommendation response and the user-directed insight; determine, by the recommendation engine, a plurality of dashboard profiles based on the one or more parameters associated with the recommendation response and the user-directed insight, wherein the plurality of dashboard profiles comprises the first dashboard profile; rank, by the recommendation engine, the plurality of dashboard profiles based on relevancy based on the recommendation response and the user-directed insight; and select, by the recommendation engine, the first dashboard profile based on ranking the plurality of dashboard profiles.

Example 4 is the system of any previous or subsequent example, wherein the plurality of recommendations comprises a second recommendation; and the processor-executable instructions to generate, by the recommendation engine, the plurality of recommendations based on the user-directed insight cause the processor to further execute processor-executable instructions stored in the non-transitory computer-readable medium to: generate, by the content generator, a second recommendation response based on the user-directed insight; determine, by the recommendation engine, a no-match result for a second dashboard profile based on the second recommendation response; determine, by the recommendation engine, a plurality of dashboard components for the second recommendation response; and generate, by the recommendation engine, the second recommendation comprising the second recommendation response and a link to a prompt comprising the plurality of dashboard components for the second recommendation response.

Example 5 is the system of any previous or subsequent example, wherein the processor-executable instructions to determine by the recommendation engine, the plurality of dashboard components for the second recommendation response cause the processor to further execute processor-executable instructions stored in the non-transitory computer-readable medium to: transmit, by the recommendation engine, the second recommendation response to the content generator; and generate, by the content generator, the plurality of dashboard components based on the second recommendation response.

Example 6 is the system of any previous or subsequent example, wherein the processor is further configured to execute processor-executable instructions stored in the non-transitory computer-readable medium to: determine, by the insight engine, second usage tracking information associated with a second client device; and generate, by the insight engine, the user-directed insight based on the first usage tracking information associated with the first client device and the second usage tracking information associated with the second client device.

Example 7 is a method comprising: receiving, by an insight engine, first usage tracking information associated with a first client device; generating, by the insight engine, a user-directed insight based on the first usage tracking information associated with the first client device, wherein the user-directed insight comprises a natural language insight; transmitting, by the insight engine, the user-directed insight and the first usage tracking information to a recommendation engine; generating, by the recommendation engine, a plurality of recommendations based on the user-directed insight and the first usage tracking information, wherein each of the plurality of recommendations comprises a recommendation response and one of: a recommendation for a dashboard profile corresponding to the user-directed insight; or a recommendation for creating a dashboard corresponding to the user-directed insight; and transmitting, to the first client device, the plurality of recommendations based on the user-directed insight.

Example 8 is the method of any previous or subsequent example wherein: the recommendation response comprises a first recommendation response; and generating, by the recommendation engine, the plurality of recommendations based on the user-directed insight and the first usage tracking information further comprises: determining, by the recommendation engine, one or more parameters associated with the first recommendation response and the user-directed insight; determining, by the recommendation engine, a plurality of dashboard profiles based on the one or more parameters associated with the first recommendation response and the user-directed insight, wherein the plurality of dashboard profiles comprise a first dashboard profile; ranking, by the recommendation engine, the plurality of dashboard profiles based on relevancy based on the first recommendation response and the user-directed insight; and selecting, by the recommendation engine, the first dashboard profile based on ranking the plurality of dashboard profiles.

Example 9 is the method of any previous or subsequent example wherein generating, by the recommendation engine, the plurality of recommendations based on the user-directed insight and the first usage tracking information further comprises: generating, by the recommendation engine, a first recommendation comprising the first recommendation response and a link to the first dashboard profile from the recommendation response, the plurality of recommendations comprising the first recommendation.

Example 10 is the method of any previous or subsequent example wherein: the plurality of recommendations comprises a first recommendation; and generating, by the recommendation engine, the plurality of recommendations based on the user-directed insight and the first usage tracking information further comprises: generating, by a content generator within the recommendation engine, a first recommendation response based on the user-directed insight; determining, by the recommendation engine, a no-match result for a dashboard profile based on the first recommendation response; determining, by the recommendation engine, a plurality of dashboard components for the first recommendation response and the first usage tracking information; and generating, by the recommendation engine, the first recommendation comprising the first recommendation response and a link to a prompt comprising the plurality of dashboard components for the first recommendation response.

Example 11 is the method of any previous or subsequent example wherein determining by the recommendation engine, the plurality of dashboard components for the first recommendation response and the first usage tracking information comprises: transmitting, by the recommendation engine, the first recommendation response and the first usage tracking information to the content generator; and generating, by the content generator, the plurality of dashboard components based on the first recommendation response and the first usage tracking information.

Example 12 is the method of any previous or subsequent example wherein determining, by the recommendation engine, a no-match result for a dashboard profile based on the first recommendation response comprises: determining, by the recommendation engine, one or more parameters associated with the first recommendation response and the user-directed insight; determining, by the recommendation engine, a plurality of dashboard profiles based on the one or more parameters associated with the first recommendation response and the user-directed insight; ranking, by the recommendation engine, the plurality of dashboard profiles based on relevancy based on the first recommendation response and the user-directed insight; and determining, by the recommendation engine, that a rank of each of the plurality of dashboard profiles is below a ranking threshold; and determining, by the recommendation engine, the no-match result for the dashboard profile based on the rank of each of the plurality of dashboard profiles.

Example 13 is the method of any previous or subsequent example, wherein the method further comprises: determining, by the insight engine, second usage tracking information associated with a second client device; and generating, by the insight engine, the user-directed insight based on the first usage tracking information associated with the first client device and the second usage tracking information associated with the second client device.

Example 14 is the method of any previous or subsequent example, wherein determining, by the insight engine, the second usage tracking information associated with the second client device further comprises: determining, by the insight engine, that the first usage tracking information comprises one or more of: first usage metrics associated with the first client device; or first user-based parameters associated with the first client device; and determining, by the insight engine, that the second usage tracking information comprises one or more of the first usage metrics associated with the first client device or the first user-based parameters associated with the first client device.

Example 15 is a non-transitory computer-readable medium comprising processor-executable instructions configured to cause one or more processors to: determine, by an insight engine, first usage tracking information associated with a first client device; generate, by the insight engine, a user-directed insight based on the first usage tracking information associated with the first client device, wherein the user-directed insight comprises a natural language insight; generate, by a recommendation engine, a plurality of recommendations based on the user-directed insight and the first usage tracking information, wherein each of the plurality of recommendations comprises a recommendation response and one of: a recommendation for a dashboard profile corresponding to the user-directed insight; or a recommendation for creating a dashboard corresponding to the user-directed insight; and transmit, to the first client device, the plurality of recommendations based on the user-directed insight to the first client device.

Example 16 is the non-transitory computer-readable medium of any previous or subsequent example, wherein: the recommendation response comprises a first recommendation response; and the processor-executable instructions to generate, by the recommendation engine, the plurality of recommendations based on the user-directed insight and the first usage tracking information cause the processor to further execute processor-executable instructions stored in the non-transitory computer-readable medium to: determine, by the recommendation engine, one or more parameters associated with the first recommendation response and the user-directed insight; determine, by the recommendation engine, a plurality of dashboard profiles based on the one or more parameters associated with the first recommendation response and the user-directed insight, wherein the plurality of dashboard profiles comprise a first dashboard profile; rank, by the recommendation engine, the plurality of dashboard profiles based on relevancy based on the first recommendation response and the user-directed insight; select, by the recommendation engine, the first dashboard profile based on ranking the plurality of dashboard profiles; and generate, by the recommendation engine, a first recommendation comprising the first recommendation response and a link to the first dashboard profile from the recommendation response, wherein the plurality of recommendations comprises the first recommendation.

Example 17 is the non-transitory computer-readable medium of any previous or subsequent example, wherein: the plurality of recommendations comprises a first recommendation; and the processor-executable instructions to generate, by the recommendation engine, the plurality of recommendations based on the user-directed insight and the first usage tracking information cause the processor to further execute processor-executable instructions stored in the non-transitory computer-readable medium to: generate, by a content generator within the recommendation engine, a first recommendation response based on the user-directed insight; determine, by the recommendation engine, a no-match result for a dashboard profile based on the first recommendation response; transmit, by the recommendation engine, the first recommendation response and the first usage tracking information to the content generator; generate, by the content generator, a plurality of dashboard components for the first recommendation response and the first usage tracking information; and generate, by the recommendation engine, the first recommendation comprising the first recommendation response and a link to a prompt comprising the plurality of dashboard components for the first recommendation response.

Example 18 is the non-transitory computer-readable medium of any previous or subsequent example, wherein: the recommendation for the dashboard profile comprises a link to the dashboard profile corresponding to the user-directed insight; or the recommendation for creating the dashboard comprises a link to a plurality of dashboard components for creating the dashboard corresponding to the user-directed insight.

Example 19 is the non-transitory computer-readable medium of any previous or subsequent example, wherein: the processor-executable instructions to determine, by the insight engine, the first usage tracking information associated with the first client device cause the processor to further execute processor-executable instructions stored in the non-transitory computer-readable medium to determine, by the insight engine, second usage tracking information associated with a second client device; and the processor-executable instructions to generate, by the insight engine, the user-directed insight based on the first usage tracking information associated with the first client device cause the processor to further execute processor-executable instructions stored in the non-transitory computer-readable medium to generate, by the insight engine, the user-directed insight based on the first usage tracking information and the second usage tracking information.

Example 20 is the non-transitory computer-readable medium of any previous or subsequent example, wherein the processor-executable instructions to determine by the insight engine, the first usage tracking information associated with the first client device cause the processor to further execute processor-executable instructions stored in the non-transitory computer-readable medium to: determine, by the insight engine, usage metrics associated with the first client device; determine, by the insight engine, user-based parameters associated with the first client device; and determine, by the insight engine, the first usage tracking information based on the usage metrics and the user-based parameters associated with the first client device

What is claimed is:

1. A system comprising:
  a non-transitory computer-readable medium;
  a communications interface; and
  a processor communicatively coupled to the non-transitory computer-readable medium and the communications interface, the processor configured to execute processor-executable instructions stored in the non-transitory computer-readable medium to:
    determine, by an insight engine, first usage tracking information associated with a first client device;
    generate, by the insight engine, a user-directed insight based on the first usage tracking information associated with the first client device;
    generate, by a recommendation engine, a plurality of recommendation responses based on the user-directed insight and the first usage tracking information, wherein a recommendation response comprises a natural language recommendation for addressing the user-directed insight;
    determine, by the recommendation engine, one or more parameters associated with each of the plurality of recommendation responses;
    determine, by the recommendation engine, a plurality of dashboard profiles based on the one or more parameters and the user-directed insight, wherein each dashboard profile of the plurality of dashboard profiles is configured to provide distinct subject matter associated with the one or more parameters of a respective recommendation response;
    generate, by the recommendation engine, a plurality of recommendations wherein each of the plurality of recommendations comprises a respective recommendation response of the plurality of recommendation responses and a dashboard recommendation for a respective dashboard profile of the plurality of dashboard profiles; and
    transmit, to the first client device, the plurality of recommendations.

2. The system of claim 1, wherein:
  the plurality of recommendations comprises a first recommendation;
  the plurality of dashboard profiles comprises a first dashboard profile;

the plurality of recommendation responses comprises a first recommendation response;

the processor is further configured to execute processor-executable instructions stored in the non-transitory computer-readable medium to: responsive to receiving an input associated with the user-directed insight, transmit the user-directed insight to a content generator within the recommendation engine;

the processor-executable instructions to generate, by the recommendation engine, the plurality of recommendation responses cause the processor to further execute processor-executable instructions stored in the non-transitory computer-readable medium to: generate, by the content generator within the recommendation engine, a first recommendation response based on the user-directed insight and the first usage tracking information;

the processor-executable instructions to determine, by the recommendation engine, the plurality of dashboard profiles cause the processor to further execute processor-executable instructions stored in the non-transitory computer-readable medium to: determine, by the recommendation engine, the first dashboard profile based on the first recommendation response; and the processor-executable instructions to generate, by the recommendation engine, the plurality of recommendations cause the processor to further execute processor-executable instructions stored in the non-transitory computer-readable medium to: generate, by the recommendation engine, the first recommendation comprising the first recommendation response and a link to the first dashboard profile from the recommendation.

3. The system of claim 1, wherein the processor-executable instructions cause the processor to further execute processor-executable instructions stored in the non-transitory computer-readable medium to:

rank, by the recommendation engine, the plurality of dashboard profiles based on relevancy to the respective recommendation response and the respective user-directed insight; and select, by the recommendation engine, a first dashboard profile based on ranking the plurality of dashboard profiles.

4. The system of claim 2, wherein:

the plurality of recommendation responses comprises a second recommendation response;

the plurality of dashboard profiles comprises a second dashboard profile;

the plurality of recommendations comprises a second recommendation; and the processor-executable instructions to determine, by the recommendation engine, a plurality of dashboard profiles cause the processor to further execute processor-executable instructions stored in the non-transitory computer-readable medium to: determine, by the recommendation engine, a no-match result for a second dashboard profile based on the second recommendation response; and the processor-executable instructions to generate, by the recommendation engine, the plurality of recommendations based on the user-directed insight cause the processor to further execute processor-executable instructions stored in the non-transitory computer-readable medium to:

determine, by the recommendation engine, a plurality of dashboard components for the second recommendation response; and generate, by the recommendation engine, the second recommendation comprising the second recommendation response and a link to a prompt comprising the plurality of dashboard components for the second recommendation response.

5. The system of claim 4, wherein the processor-executable instructions to determine by the recommendation engine, the plurality of dashboard components for the second recommendation response cause the processor to further execute processor-executable instructions stored in the non-transitory computer-readable medium to:

transmit, by the recommendation engine, the second recommendation response to the content generator; and generate, by the content generator, the plurality of dashboard components based on the second recommendation response.

6. The system of claim 1, wherein the processor is further configured to execute processor-executable instructions stored in the non-transitory computer-readable medium to:

determine, by the insight engine, second usage tracking information associated with a second client device; and generate, by the insight engine, the user-directed insight based on the first usage tracking information associated with the first client device and the second usage tracking information associated with the second client device.

7. A method comprising:

receiving, by an insight engine, first usage tracking information associated with a first client device;

generating, by the insight engine, a user-directed insight based on the first usage tracking information associated with the first client device;

transmitting, by the insight engine, the user-directed insight and the first usage tracking information to a recommendation engine;

generating, by the recommendation engine, a plurality of recommendation responses based on the user-directed insight and the first usage tracking information, wherein a recommendation response comprises a natural language recommendation for addressing the user-directed insight;

determining, by the recommendation engine, a plurality of dashboard profiles based on the user-directed insight and the plurality of recommendation responses, wherein each dashboard profile of the plurality of dashboard profiles is configured to provide distinct subject matter associated with a respective recommendation response;

generating, by the recommendation engine, a plurality of recommendations, wherein each of the plurality of recommendations comprises a respective recommendation response of the plurality of recommendation responses and a dashboard recommendation for a respective dashboard profile of the plurality of dashboard profiles; and one of:

transmitting, to the first client device, the plurality of recommendations.

8. The method of claim 7, wherein:

the recommendation response comprises a first recommendation response; and determining, by the recommendation engine, the plurality of dashboard profiles based on the user-directed insight and the plurality of recommendation responses further comprises:

ranking, by the recommendation engine, the plurality of dashboard profiles based on relevancy to the first recommendation response and the user-directed insight; and selecting, by the recommendation engine, a first dashboard profile based on ranking the plurality of dashboard profiles.

9. The method of claim 8, wherein generating, by the recommendation engine, the plurality of recommendations further comprises:

generating, by the recommendation engine, a first recommendation comprising the first recommendation response and a link to the first dashboard profile from the recommendation response, the plurality of recommendations comprising the first recommendation.

10. The method of claim 7, wherein:

the plurality of recommendations comprises a first recommendation;

the plurality of recommendation responses comprises a first recommendation response;

generating, by the recommendation engine, the plurality of recommendation responses based on the user-directed insight and the first usage tracking information further comprises:

generating, by a content generator within the recommendation engine, a first recommendation response based on the user-directed insight;

determining, by the recommendation engine, the plurality of dashboard profiles based on the user-directed insight and the first recommendation response further comprises:

determining, by the recommendation engine, a no-match result for a dashboard profile based on the first recommendation response;

determining, by the recommendation engine, a plurality of dashboard components for the first recommendation response and the first usage tracking information; and generating, by the recommendation engine, the plurality of recommendations further comprises:

generating, by the recommendation engine, the first recommendation comprising the first recommendation response and a link to a prompt comprising the plurality of dashboard components for the first recommendation response.

11. The method of claim 10, wherein determining by the recommendation engine, the plurality of dashboard components for the first recommendation response and the first usage tracking information comprises:

transmitting, by the recommendation engine, the first recommendation response and the first usage tracking information to the content generator; and generating, by the content generator, the plurality of dashboard components based on the first recommendation response and the first usage tracking information.

12. The method of claim 10, wherein determining, by the recommendation engine, a no-match result for a dashboard profile based on the first recommendation response comprises:

determining, by the recommendation engine, one or more parameters associated with the first recommendation response and the user-directed insight;

determining, by the recommendation engine, a plurality of dashboard profiles based on the one or more parameters associated with the first recommendation response and the user-directed insight;

ranking, by the recommendation engine, the plurality of dashboard profiles based on relevancy based on the first recommendation response and the user-directed insight; and determining, by the recommendation engine, that a rank of each of the plurality of dashboard profiles is below a ranking threshold; and determining, by the recommendation engine, the no-match result for the dashboard profile based on the rank of each of the plurality of dashboard profiles.

13. The method of claim 7, the method further comprising:

determining, by the insight engine, second usage tracking information associated with a second client device; and generating, by the insight engine, the user-directed insight based on the first usage tracking information associated with the first client device and the second usage tracking information associated with the second client device.

14. The method of claim 13, wherein determining, by the insight engine, the second usage tracking information associated with the second client device further comprises:

determining, by the insight engine, that the first usage tracking information comprises one or more of:
first usage metrics associated with the first client device; or
first user-based parameters associated with the first client device; and determining, by the insight engine, that the second usage tracking information comprises one or more of the first usage metrics associated with the first client device or the first user-based parameters associated with the first client device.

15. A non-transitory computer-readable medium comprising processor-executable instructions configured to cause one or more processors to:

determine, by an insight engine, first usage tracking information associated with a first client device;

generate, by the insight engine, a user-directed insight based on the first usage tracking information associated with the first client device;

generate, by a recommendation engine, a plurality of recommendation responses based on the user-directed insight and the first usage tracking information, wherein a recommendation response comprises a natural language recommendation for addressing the user-directed insight;

determine, by the recommendation engine, one or more parameters associated with each of the plurality of recommendation responses;

determine, by the recommendation engine, a plurality of dashboard profiles based on the one or more parameters and the user-directed insight, wherein each dashboard profile of the plurality of dashboard profiles is configured to provide distinct subject matter associated with the one or more parameters of a respective recommendation response;

generate, by the recommendation engine, a plurality of recommendations wherein each of the plurality of recommendations comprises a respective recommendation response of the plurality of recommendation responses and a dashboard recommendation for a respective dashboard profile of the plurality of dashboard profiles; and transmit, to the first client device, the plurality of recommendations.

16. The non-transitory computer-readable medium of claim 15, wherein:
the plurality of dashboard profiles comprises a first dashboard profiles; and
the processor-executable instructions to determine, by the recommendation engine, the plurality of dashboard profiles based on the one or more parameters and the user-directed insight cause the processor to further execute processor-executable instructions stored in the non-transitory computer-readable medium to:
rank, by the recommendation engine, the plurality of dashboard profiles based on relevancy based on a recommendation response and the user-directed insight; and
select, by the recommendation engine, the first dashboard profile based on ranking the plurality of dashboard profiles.

17. The non-transitory computer-readable medium of claim 15, wherein:
the plurality of recommendation responses comprises a first recommendation response;
the processor-executable instructions to determine, by the recommendation engine, the plurality of dashboard profiles based on the user-directed insight and the first recommendation response cause the processor to further execute processor-executable instructions stored in the non-transitory computer-readable medium to:
determine, by the recommendation engine, a no-match result for a dashboard profile based on the first recommendation response;
transmit, by the recommendation engine, the first recommendation response and the first usage tracking information to a content generator;
receive, from the content generator, a plurality of dashboard components for the first recommendation response and the first usage tracking information; and
the processor-executable instructions to generate, by the recommendation engine, the plurality of recommendations cause the processor to further execute processor-executable instructions stored in the non-transitory computer-readable medium to:
generate, by the recommendation engine, a first recommendation comprising the first recommendation response and a link to a prompt comprising the plurality of dashboard components for the first recommendation response.

18. The non-transitory computer-readable medium of claim 15, wherein the dashboard recommendation comprises:
a link to the respective dashboard profile corresponding to the user-directed insight; or a link to a plurality of dashboard components for creating the respective dashboard profile corresponding to the user-directed insight.

19. The non-transitory computer-readable medium of claim 15, wherein:
the processor-executable instructions to determine, by the insight engine, the first usage tracking information associated with the first client device cause the processor to further execute processor-executable instructions stored in the non-transitory computer-readable medium to determine, by the insight engine, second usage tracking information associated with a second client device; and
the processor-executable instructions to generate, by the insight engine, the user-directed insight based on the first usage tracking information associated with the first client device cause the processor to further execute processor-executable instructions stored in the non-transitory computer-readable medium to generate, by the insight engine, the user-directed insight based on the first usage tracking information and the second usage tracking information.

20. The non-transitory computer-readable medium of claim 15, wherein the processor-executable instructions to determine by the insight engine, the first usage tracking information associated with the first client device cause the processor to further execute processor-executable instructions stored in the non-transitory computer-readable medium to:
determine, by the insight engine, usage metrics associated with the first client device;
determine, by the insight engine, user-based parameters associated with the first client device; and
determine, by the insight engine, the first usage tracking information based on the usage metrics and the user-based parameters associated with the first client device.

* * * * *